May 21, 1957     E. B. MANCKE     2,793,112
PROCESS FOR TREATING MANGANESE ORE
Filed July 2, 1956
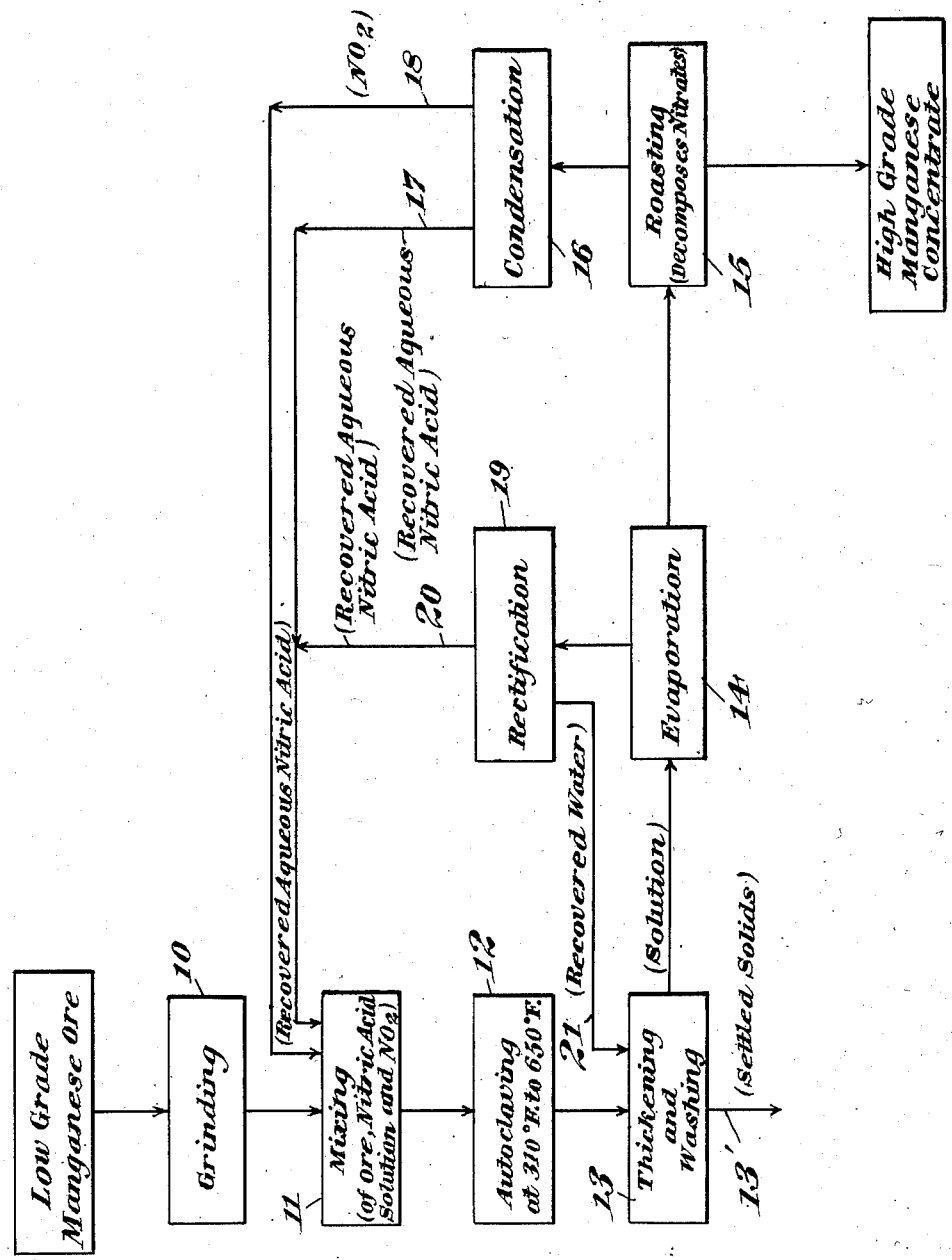
INVENTOR
*Edgar B. Mancke.*
BY
ATTORNEY

United States Patent Office 2,793,112
Patented May 21, 1957

2,793,112

PROCESS FOR TREATING MANGANESE ORE

Edgar B. Mancke, Bethlehem, Pa., assignor to Bethlehem Steel Company, a corporation of Pennsylvania Application July 2, 1956, Serial No. 595,315

11 Claims. (Cl. 75—121)

This application is a continuation-in-part application of Serial No. 303,581, filed August 9, 1952, now abandoned.

My invention relates to the treatment of manganese ores for the purpose of separating the manganese from other constituents of the ores. It particularly relates to the treatment of the so-called "low grade" manganese ores for the purpose of obtaining products having considerably higher contents of manganese than in the ores being treated.

Manganese is in great demand but there is a scarcity in the United States of manganese bearing ores which contain a sufficiently high content of manganese to be profitable for treatment by the usual methods. On the other hand there is an abundance of so-called "low grade" ores containing manganese having smaller contents of manganese. My process is particularly adapted to the treatment of such low grade ores to produce products having a high manganese content which products are adapted to be treated by the usual methods employed with high grade manganese ores.

My invention is a process for treating manganese ores which comprises the steps of mixing an aqueous solution of nitric acid with the ore to form a slurry, treating such slurry with nitrogen dioxide ($NO_2$) or nitric oxide (NO) or a mixture of nitrogen dioxide and nitric oxide, autoclaving the slurry at a temperature of from 310° F. to 650° F., separating the solution containing manganese nitrate from the insoluble matter, evaporating water from the solution, and roasting the resulting product to give manganese in oxide form and liberate nitric acid and oxides of nitrogen.

The accompanying drawing, which forms a part of my disclosure is a schematic flow sheet indicating the various steps of a way of performing my process. Referring to the drawing, a low grade manganese ore is ground as indicated at 10. The ore is then mixed with an aqueous solution of nitric acid and treated with $NO_2$ gas, as indicated at 11. The mixture is then autoclaved at a temperature from 310° F. to 650° F. as indicated at 12. The mixture of the undissolved part of the ore and the solution of manganese and any other nitrates formed is thickened, settled to effect a separation of the solution and insoluble portion, and the insoluble portion washed, as indicated at 13, the settled solids being passed off as indicated at 13', for utilization in any desired way. The separated solution, containing manganese nitrate, is subjected to evaporation, as indicated at 14, to get rid of most of the water. The highly concentrated product from the evaporation stage is then roasted, as indicated at 15, to get rid of the remaining water and decompose the nitrates to form manganese oxide and oxides of any other nitrates which have been formed during the process. During the roasting treatment, nitric acid is liberated as is also $NO_2$. This nitric acid and $NO_2$, together with water vapor, are passed through a condenser to condense the nitric acid and water, as indicated at 16, to form an aqueous solution of nitric acid which is fed by way of pipe 17 to the mixing and treating stage of the process indicated at 11 where the nitric acid is mixed with more ore to form a slurry. During the condensation step indicated at 16, $NO_2$ gas is separated from the nitric acid and passes by way of pipe 18 to the mixing and treating step 11 of the process. During the stage of evaporation, indicated at 14, not only is water removed from the solution but some nitric acid is removed as well. The vapors of water and nitric acid from the step of evaporation are passed through a rectifier as indicated at 19. An aqueous solution of nitric acid of the desired concentration passes from the rectifier by way of pipe 20 which joins with pipe 17 for feeding the aqueous solution of nitric acid to the mixing step at 11. The water recovered from the rectifier is fed by pipe 21 to the washing stage where the settled solids are washed.

As an example of my process, I shall now describe the treatment of a low grade manganese ore, known as "Mangan-Louise." The particular ore of this illustration of my process contains 36% iron, 10% manganese and 0.09% phosphorus. The ore is ground to a mesh of about 150 and then mixed with an aqueous solution of nitric acid, having a concentration of about 25%, to form a slurry. The amount of nitric acid solution used is such that there are present 250 parts of nitric acid and 750 parts of water for each 1000 parts of ore being treated.

This slurry is maintained at a temperature of about 180° F. for about 4 hours. During such period, $NO_2$ gas is bubbled into the slurry. The slurry is kept agitated by any suitable means. The amount of $NO_2$ gas used in this particular example of my process is about 48 parts per 1000 parts of ore being treated. During this stage of my process a considerable amount of the manganese is dissolved at a nitrate of manganese. Some of the iron of the ore is dissolved as ferric nitrate and small amounts of nitrates are formed and dissolved of other ore constituents, as aluminum and calcium. A considerable amount of the phosphorus is dissolved, probably as phosphoric acid.

Following this treatment the slurry is autoclaved at a temperature of 400° F. for 30 minutes. The pressure was about 275 pounds per sq. in. gauge. This autoclaving substantially increases the amount of manganese dissolved as a nitrate from the ore and dissociates most of the ferric nitrate formed in the previous stage of the treatment to precipitate iron as ferric oxide or hydrated ferric oxide and release nitric acid in the solution in the liquid phase. Most of the dissolved phosphorus is precipitated with the iron. The solution of nitrate of manganese and small amounts of other nitrates is then separated from the insoluble matter, the separated insoluble portion being washed and the wash water added to the separated solution. The separated solution, carrying manganese nitrate is now evaporated to get rid of most of the water to form a highly concentrated solution. This solution is then roasted to decompose the nitrate of manganese and other nitrates to get manganese and other metals in the oxide form, and also to liberate nitric acid and $NO_2$ gas together with water vapor. The manganese oxide product contains most of the manganese of the ore and but little of the iron, constituting a concentrate having a high manganese to iron ratio. The liberated nitric acid and $NO_2$ gas together with water vapor is passed through a condenser to condense the nitric acid and water vapor to form an aqueous solution of nitric acid and separate such acid from the $NO_2$ gas.

The $NO_2$ gas which is given off during the roasting stage of the process, and which is separated from the nitric acid in the condenser, is fed back to the treatment stage of the operation indicated at 11 in the drawing.

It will be apparent from the above that my process is cyclic in the sense that the reagents employed (HNO₃ and NO₂) are regenerated and returned for the treatment of ore in the same way as indicated above.

During the roasting treatment, some NO gas is formed in addition to the NO₂, and accompanies the NO₂ gas when it is fed back for the treatment of more ore. The chemical effects of the NO gas are similar to that of NO₂ in my process.

I desire to point out the importance of the step of autoclaving at high temperatures. To show this importance, I shall indicate the results of treatment with and without the autoclaving step, the ore, reagents, and conditions of treatment being those of the specific example given above. The slurry of ore, involving the use of 25% nitric acid solution, was held at 180° F. for 4 hours while agitating and adding NO₂ gas all as indicated in the specific example described above. Without autoclaving, the solution was separated from the insoluble matter. This solution was found to contain 3.5% of the iron in the ore, 78% of the manganese, and 46% of the phosphorus. Proceeding, as just indicated, but including the autoclaving at 400° F. for one half hour, the solution separated from the insoluble matter, contained 1% of the iron of the ore, 92.5% of the manganese and 4.5% of the phosphorus. From this it will be apparent that the autoclaving step has considerably increased the solution of manganese and has considerably removed iron and phosphorus from such solution.

The importance of the autoclaving step is also shown by the differences in the analyses of the manganese concentrates which are produced without the autoclaving and also with it, the procedure other than the autoclaving, being identical in both cases, the ore and the conditions of operation being those indicated in the specific example given above. The analyses of the concentrates, so far as iron, manganese and phosphorus are concerned, are shown in the tables below, the analysis in Table I being that obtained when autoclaving was not employed and the analysis in Table II being that when autoclaving was used.

*Table I*

| | Percent |
|---|---|
| Fe | 7.5 |
| Mn | 47.5 |
| P | 0.2 |

*Table II*

| | Percent |
|---|---|
| Fe | 2.2 |
| Mn | 57.3 |
| P | 0.02 |

It will be obvious from these figures that a far higher grade concentrate is obtained as a result of the inclusion of the autoclaving step, the manganese content being considerably higher and the iron and phosphorus contents considerably lower.

In the above example of my process, certain specific conditions of operation are set forth, these conditions may be varied rather widely without departure from my essential process.

The concentration of the aqueous nitric acid solution employed may vary greatly. The concentration may vary from 10% to 70% although I prefer a concentration of not over 60%. The amount of acid used may vary considerably. There should be a sufficient amount of acid so that the amount of nitric acid contained in the aqueous nitric acid solution plus the NO₂ is at least sufficient to meet the stoichiometric requirements of the manganese in the ore. Preferably I use an amount in excess of these requirements. A considerable excess may be used without reducing the efficiency of the process.

In the example of my process given above, the slurry of aqueous nitric acid solution and ore is maintained at a temperature of 180° F. This temperature may vary considerably. In general the higher the temperature the more rapid the solvent action on the ore.

The temperature of autoclaving may vary from 310° F. to 650° F. Ordinarily, however, I employ a temperature from 350° F. to 450° F. When a temperature of the order of 310° F. is used, a pressure of at least 80 p. s. i. g. will be maintained in the autoclave. When the autoclaving temperature is 350° F. or higher, the pressure will be at least 135 p. s. i. g.

In the use of the term autoclaving in this invention, it is to be understood that I am referring to the well-known process of maintaining a liquid in the liquid phase at an elevated temperature and superatmospheric pressure. For any given temperature, a definite pressure will result; this is the vapor pressure of the liquid phase. If gases are introduced, such as the NO₂ gas of my invention, the pressure will be the sum of the aforementioned vapor pressure and the partial pressure of the introduced gas. Thus, within the operating temperature range of from 310° F. to 650° F., for the system herein described, a vapor pressure is maintained within the autoclave sufficient to retain the water and nitric acid in the liquid phase.

In the specific example of my process, given above, the ore is subjected to the action of nitric acid and NO₂ prior to the autoclaving step. In a variation of my process the two treatments may be combined. In this form of my invention the slurry of aqueous nitric acid solution and ore is fed directly into the autoclave and there subjected to the action of NO₂ gas during the autoclaving at a temperature of from 310° F. to 650° F.

My process is preferably continuous, i. e., the ore passes continuously through the mixing and autoclaving stages, and through the stage of separating the solution from the undissolved part, and the solution passes continuously through the evaporator and roasting treatments, and nitric acid solution and NO₂ are continuously being fed back into the system to act on more ore. While I prefer the continuous method for manipulative and economic reasons, my process is fully effective chemically when a batch method is employed. By the "batch" method I mean that method of procedure wherein the receptacles in use are charged, treated and then discharged, following which another batch may be charged and treated, and so on.

My process is not only applicable to ores of manganese, but also to slags which contain this element. Where, in the claims, I refer to "ore" this term is to be understood as sufficiently comprehensive to include a slag.

I claim:

1. A process for treating manganese ore comprising the steps of forming a slurry of the ore and an aqueous solution of nitric acid, subjecting the slurry to the action of an oxide of the group consisting of NO, NO₂ and mixtures thereof, the amount of nitric acid in the aqueous solution of nitric acid plus the oxide of nitrogen being in excess of the amount necessary to satisfy the stoichiometric requirements of the manganese in the ore, autoclaving the slurry at a temperature of from 310° F. to 650° F., separating the resulting solution from the undissolved matter, removing water from the solution, roasting the manganese values from such solution and thereby producing a manganese concentrate in oxidic form high in manganese and low in iron.

2. A process for treating manganese ore comprising the steps of forming a slurry of the ore and an aqueous solution of nitric acid, subjecting the slurry to the action of NO₂ gas, the amount of nitric acid in the aqueous solution of nitric acid plus NO₂ being in excess of the amount necessary to satisfy the stoichiometric requirements of the manganese in the ore, autoclaving the slurry at a temperature of from 310° F. to 650° F., separating the resulting solution containing manganese nitrate from the undissolved matter, removing water from the solution, roasting the manganese nitrate from such solution, and thereby forming manganese oxide and liberating nitric acid and $NO_2$.

3. A process for treating manganese ore comprising the steps of forming a slurry of the ore and an aqueous solution of nitric acid, subjecting the slurry to the action of $NO_2$ gas, the amount of nitric acid contained in the aqueous nitric acid solution plus the $NO_2$ being in excess of the amount sufficient to meet the stoichiometric requirements of the manganese in the ore, autoclaving the slurry at a temperature of from 310° F. to 650° F., separating the resulting solution containing manganese from the insoluble matter, concentrating the solution by evaporation, roasting the concentrated solution and thereby producing manganese in the oxide form and liberating nitric acid and $NO_2$.

4. A process for treating manganese ore comprising the steps of forming a slurry of the ore and an aqueous solution of nitric acid, autoclaving the slurry at a temperature of from 310° F. to 650° F., subjecting the slurry to the action of $NO_2$ gas during such autoclaving, the amount of nitric acid in the aqueous solution of nitric acid plus $NO_2$ being in excess of the amount necessary to satisfy the stoichiometric requirements of the manganese in the ore, separating the resulting solution from the insoluble matter, concentrating the solution by evaporation, roasting the concentrated solution, and thereby producing manganese in the oxide form and liberating nitric acid and $NO_2$.

5. A process for treating manganese ore comprising the steps of forming a slurry of the ore and an aqueous solution of nitric acid, subjecting the slurry to the action of $NO_2$ gas, the amount of nitric acid plus $NO_2$ being in excess of the amount necessary to satisfy the stoichiometric requirements of the manganese in the ore, autoclaving the slurry at a temperature of from 350° F. to 450° F., separating the solution from the insoluble matter, concentrating the solution by evaporation, roasting the concentrated solution and thereby forming manganese in the oxide form and liberating nitric acid and $NO_2$.

6. A process for treating manganese ore comprising the steps of forming a slurry of the ore and an aqueous solution of nitric acid, subjecting the slurry to the action of $NO_2$ and NO gases, the amount of nitric acid in the aqueous solution of nitric acid plus $NO_2$ and NO being in excess of the amount necessary to satisfy the stoichiometric requirements of the manganese in the ore, autoclaving the slurry at a temperature of from 310° F. to 650° F., separating the resulting solution containing manganese from the insoluble matter, concentrating the solution by evaporation, roasting the concentrated solution and thereby producing manganese in the oxide form and liberating nitric acid and $NO_2$ and NO gases.

7. A process for treating manganese ores to produce a solution of manganese nitrate having a high manganese to iron ratio comprising the steps of forming a slurry of the ore and an aqueous solution of nitric acid, subjecting the slurry to the action of an oxide of the group consisting of NO, $NO_2$ and mixtures thereof, the amount of nitric acid in the aqueous solution of nitric acid plus the oxide of nitrogen being in excess of the amount necessary to satisfy the stoichiometric requirements of the manganese in the ore, autoclaving the slurry at a temperature of from 350° F. to 450° F. and separating the solution from the undissolved matter.

8. A process for treating manganese ore comprising the steps of forming a slurry of the ore and an aqueous solution of nitric acid, subjecting the slurry to the action of $NO_2$ gas, the amount of nitric acid in the aqueous solution of nitric acid plus $NO_2$ being in excess of the amount necessary to satisfy the stoichiometric requirements of the manganese in the ore, autoclaving the slurry at a temperature of from 350° F. to 450° F. and at a pressure of not less than 120 p. s. i. g., separating the solution from the insoluble matter, concentrating the solution by evaporation, roasting the concentrated solution and thereby producing manganese in the oxide form and liberating nitric acid and $NO_2$.

9. A process for treating manganese ore comprising the steps of forming a slurry of the ore and an aqueous solution of nitric acid, subjecting the slurry to the action of an oxide of the group consisting of NO, $NO_2$ and mixtures thereof, the amount of nitric acid in the aqueous solution of nitric acid plus the oxide of nitrogen being in excess of the amount necessary to satisfy the stoichiometric requirements of the manganese in the ore, autoclaving the slurry at a temperature of from 310° F. to 650° F. and thereby maintaining a vapor pressure within the autoclave sufficient to retain the water and nitric acid in the liquid phase, separating the resulting solution from the undissolved matter, removing water from the solution, roasting the manganese values from such solution and thereby producing a manganese concentrate in the oxide state high in manganese and low in iron.

10. A process for treating manganese ore comprising the steps of forming a slurry of the ore and an aqueous solution of nitric acid, subjecting the slurry to the action of $NO_2$ gas, the amount of nitric acid in the aqueous solution of nitric acid plus $NO_2$ being in excess of the amount necessary to satisfy the stoichiometric requirements of the manganese in the ore, autoclaving the slurry at a temperature of from 310° F. to 650° F., and thereby maintaining a vapor pressure within the autoclave sufficient to retain the water and nitric acid in the liquid phase, separating the resulting solution containing manganese nitrate from the undissolved matter, removing water from the solution, roasting the manganese nitrate from such solution, and thereby forming manganese oxide and liberating nitric acid and $NO_2$.

11. A process for treating manganese ore comprising the steps of forming a slurry of the ore and an aqueous solution of nitric acid, subjecting the slurry to the action of $NO_2$ gas, the amount of nitric acid plus $NO_2$ being in excess of the amount necessary to satisfy the stoichiometric requirements of the manganese in the ore, autoclaving the slurry at a temperature of from 350° F. to 450° F., and thereby maintaining a vapor pressure within the autoclave sufficient to retain the water and nitric acid in the liquid phase, separating the solution from the insoluble matter, concentrating the solution by evaporation, roasting the concentrated solution to produce manganese in the oxide form and to liberate nitric acid and $NO_2$, and returning the nitric acid and $NO_2$ to the treatment of more ore.

References Cited in the file of this patent

UNITED STATES PATENTS

| Number | Name | Date |
|---|---|---|
| 981,451 | McKechnie et al. | Jan. 10, 1911 |
| 1,503,229 | Clark | July 29, 1924 |
| 1,649,152 | Clark | Nov. 15, 1927 |
| 1,824,936 | Travers | Sept. 29, 1931 |
| 1,923,362 | Frazee | Aug. 22, 1933 |
| 2,005,120 | Whetzel et al. | June 18, 1935 |
| 2,344,004 | Six | Mar. 14, 1944 |

OTHER REFERENCES

Report of Investigations 3626, March 1942. "Manganese Investigations." Entire report is 30 pages and 7 figures. Published by Bureau of Mines, Washington, D. C.